Patented Feb. 6, 1923.

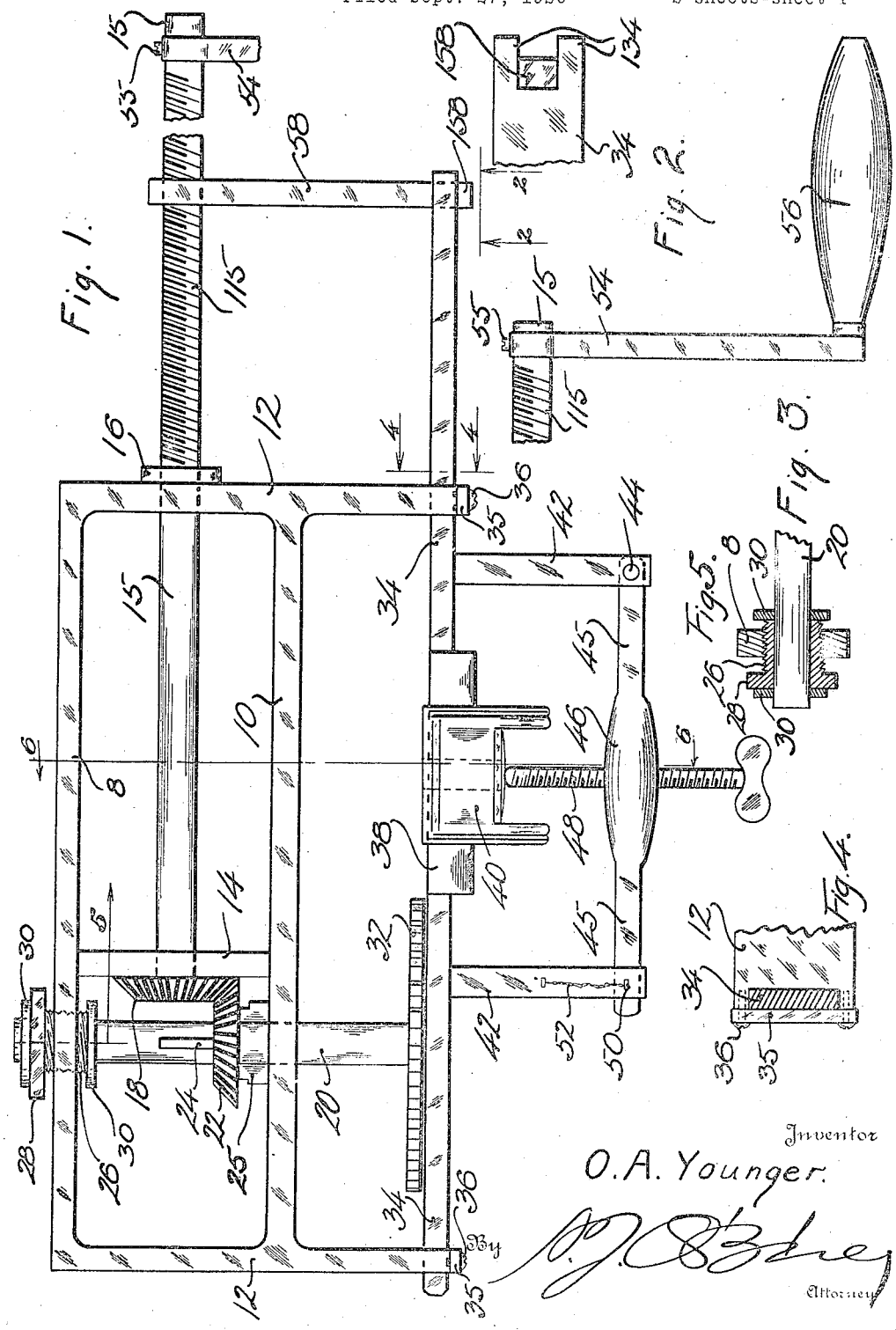

1,444,649

UNITED STATES PATENT OFFICE.

ORVILLE A. YOUNGER, OF DENVER, COLORADO.

MILLING TOOL FOR BEARINGS.

Application filed September 27, 1920. Serial No. 413,201.

*To all whom it may concern:*

Be it known that I, ORVILLE A. YOUNGER, a citizen of the United States, residing at Denver, county of Denver, and State of Colorado, have invented certain new and useful Improvements in Milling Tools for Bearings; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a tool which will hold connecting rod and main bearings of automobiles and accurately remove therefrom the small amount of metal required to be removed to make a tight, true bearing.

Briefly the invention comprises a frame in which is mounted a main driven shaft having means to drive a milling tool, and also having means to feed the bearing past the tool to bring the entire face of the bearing into engagement with the tool. A clamp is provided to hold the bearing to a moving part of the frame, and adjusting means is provided for accurately adjusting the milling tool to remove the required amount of metal from the bearing.

In the drawings forming a part of this specification.

Fig. 1 is a plan of the device with a bearing in position ready for milling.

Fig. 2 is a detail from line 2—2 of Fig. 1.

Fig. 3 is a detail of the operating crank.

Fig. 4 is a sectional detail on line 4—4 of Fig. 1; and

Fig. 5 is a sectional detail on line 5—5, Fig. 1.

Figure 6:
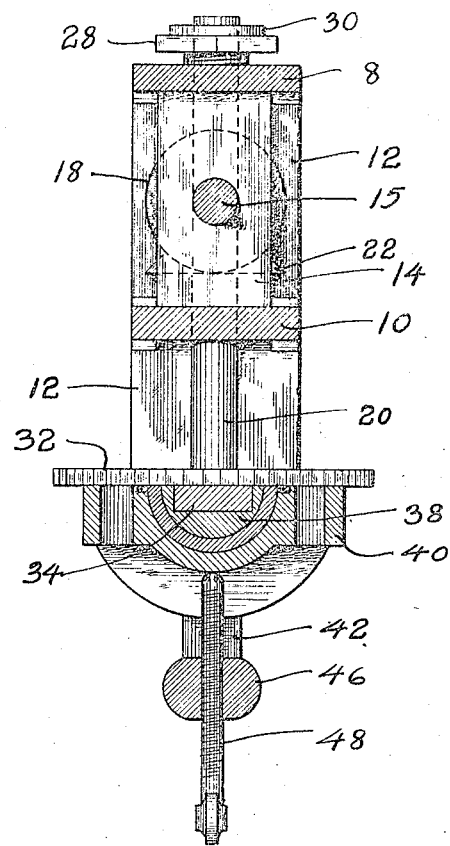
Fig. 6 is a transverse section taken on line 6—6, Fig. 1.

The device includes a main frame having a side bar 8, a center bar 10 and two end bars 12. A cross bar 14 connects intermediate points of the longitudinal bars 8 and 10, and has journaled therein a drive shaft 15 which is also journaled in one end bar 12. A collar 16 fixed on the shaft 15 bears against the outer face of the end bar 12, and a bevel gear 18 fixed on the inner end of shaft 15 bears against the opposite face of cross bar 14 thereby preventing longitudinal movement of shaft 15 in either direction.

A milling shaft 20 is journaled in the two longitudinal rails 8 and 10 and carries a bevel gear 22 meshing with and driven by gear 18. Gear 22 is splined on shaft 20 as indicated at 24 to permit limited movement on the shaft when the latter is adjusted to position the milling wheel. A collar 25 bears against the gear 22 to retain the latter in engagement with gear 18 regardless of the position of shaft 20. Adjustment of shaft 20 and the milling wheel thereon is accomplished thru the medium of a sleeve 26 threaded into rail 8 and movable by means of a nut extension 28. The shaft 20 is journaled in the sleeve 26 and has collars 30 keyed thereon and in engagement with each end of said sleeve, whereby movement of the sleeve in either direction imparts like movement to the shaft 20.

The opposite end of shaft 20 has the milling wheel 32 fixed thereon adjacent a longitudinally reciprocable rail 34 which slides between projecting fingers on the ends of the end bars 12, as seen in Fig. 4, and is retained in snug fit therein by means of straps 35 secured to said fingers by screws 36. The rail 34 has an approximately semi-cylindrical support 38 thereon, preferably integral, adapted to receive connecting-rod bearings and long enough to receive main bearings, a connecting rod bearing 40 being shown in position. Fixed to the rail 34 is a pair of rigid arms 42 extending at right angles thereto, one of which pivotally receives at 44 a clamp arm 45 having an enlargement 46 for a clamping screw 48. The outer end of arm 45 is held to the adjacent arm 42 by means of a pin 50 adapted to be projected both thru the arm 42 and the arm 45, a retaining chain 52 for pin 50 being employed if desired. The clamp screw 48 holds the bearing 40 in position on support 38 ready for engagement by the wheel 32.

A crank 54 for turning the drive shaft 15 is slipped over the end of the shaft 15 and secured by means of a set screw 55, the handle 56 being provided on the crank for convenience of manipulation.

A link 58 threaded upon left-hand threads 115 on shaft 15 is employed for imparting reciprocation to the rail 34, the 158 of the link being disposed being projecting fingers 134 of said rail 34. Thus as the screw 115 turns with shaft 15 the link 58 gradually pushes the rail 34 forward carrying the bearing 40 past the milling wheel 32 to remove the required amount of metal from its bearing face. The wheel 32 is rotated at the same time thru the medium of the bevel gears 18 and 22 as is obvious.

I claim:

1. In a milling tool, a frame, a drive shaft journaled in said frame, a driven shaft also journaled in the frame and having driving connection with the drive shaft, a milling element mounted on one end of the driven shaft, a rail reciprocable in the frame adjacent the milling element and provided with a support for a bearing, and a link threaded on the drive shaft and in engagement with said rail for the purpose of moving said rail as the drive shaft and the milling element are rotated.

2. A milling tool comprising a frame, a drive shaft journaled therein, a second shaft journaled in said frame, the axes of said shafts being perpendicular to each other, means whereby the drive shaft will rotate said second shaft, a milling cutter mounted on the end of said second shaft, a pair of bearings in said frame, a rail slidably mounted in said bearings and movable adjacent said milling cutter, a support on said rail adapted to receive a bearing, means for clamping said bearing on said support, and means comprising a link having a threaded connection with the drive shaft and connecting said rail and said drive shaft whereby as the latter rotates the former will slide in a direction parallel to said shaft.

3. A milling tool comprising a frame, a drive shaft journaled therein, a second shaft journaled in said frame, the axes of said shafts being perpendicular to each other, means whereby the drive shaft will rotate said second shaft, a milling cutter mounted on the end of said second shaft, a pair of bearings in said frame, a rail slidably mounted in said bearings and movable adjacent said milling cutter, a support on said rail adapted to receive a bearing, means for clamping said bearing on said support, and means comprising a link having a threaded connection with the drive shaft and connecting said rail and said drive shaft whereby as the latter rotates the former will slide in a direction parallel to said shaft, and means for adjusting the position of said milling element with respect to said bearing.

4. A milling tool comprising a frame, a drive shaft journaled therein, a second shaft journaled in said frame, the axes of said shafts being perpendicular to each other, means whereby the drive shaft will rotate said second shaft, a milling cutter mounted on the end of said second shaft, a pair of bearings in said frame, a rail slidably mounted in said bearings and movable adjacent said milling cutter, a support on said rail adapted to receive a bearing, means for clamping said bearing to said support, a link threaded on the drive shaft and in engagement with said rail for the purpose of moving said rail as the drive shaft and the milling element are rotated.

In testimony whereof I affix my signature.

ORVILLE A. YOUNGER.